(12) United States Patent
Zhang et al.

(10) Patent No.: US 12,147,390 B2
(45) Date of Patent: Nov. 19, 2024

(54) AUTOMATIC FILE SYSTEM CAPACITY MANAGEMENT USING FILE SYSTEM UTILIZATION PREDICTION

(71) Applicant: Dell Products L.P., Round Rock, TX (US)

(72) Inventors: Yang Zhang, Chengdu (CN); Shuangshuang Liang, Zunyi (CN); Allen Zhao, Chengdu (CN); Jingyi Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/945,608

(22) Filed: Sep. 15, 2022

(65) Prior Publication Data

US 2024/0086369 A1    Mar. 14, 2024

(30) Foreign Application Priority Data

Sep. 8, 2022  (CN) .......................... 202211094372.6

(51) Int. Cl.
*G06F 16/17*    (2019.01)
*G06F 16/13*    (2019.01)
(Continued)

(52) U.S. Cl.
CPC .......... *G06F 16/1727* (2019.01); *G06F 16/13* (2019.01); *G06F 16/183* (2019.01); *G06N 3/08* (2013.01)

(58) Field of Classification Search
CPC .... G06F 16/1727; G06F 16/13; G06F 16/183; G06N 3/08
See application file for complete search history.

(56) References Cited

U.S. PATENT DOCUMENTS 4,709,367 A    11/1987  Grafe et al.
5,953,729 A     9/1999  Cabrera et al.
(Continued)

OTHER PUBLICATIONS

"Choose Training Configurations for LSTM Using Bayesian Optimization", https://www.mathworks.com/help/deeplearning/ug/exp-mgr-sequence-regression-example.html, downloaded on Aug. 5, 2021.

(Continued)

*Primary Examiner* — Merilyn P Nguyen
(74) *Attorney, Agent, or Firm* — Ryan, Mason & Lewis, LLP

(57) ABSTRACT

Automatic file system capacity management techniques are provided using file system utilization prediction. One method comprises obtaining input data representing a utilization of a storage capacity of a file system of a given storage system; predicting a future utilization of the storage capacity of the file system based on a portion of the obtained input data; and automatically adjusting the storage capacity of the file system based at least in part on a result of a comparison of the predicted utilization of the storage capacity to a current utilization of the storage capacity. The comparison of the predicted utilization to a current utilization of the storage capacity may comprise comparing the current utilization of the storage capacity to the predicted utilization of the storage capacity for at least first and second time periods following a current time period to determine a trend of the utilization of the storage capacity.

20 Claims, 11 Drawing Sheets

(51) Int. Cl.
  *G06F 16/182*  (2019.01)
  *G06N 3/08*  (2023.01)

(56) References Cited

U.S. PATENT DOCUMENTS

| | | | |
|---|---|---|---|
| 8,589,617 | B2 | 11/2013 | Maeda |
| 8,886,911 | B2 | 11/2014 | Nemazie |
| 9,646,256 | B2 | 5/2017 | Chamness |
| 10,535,011 | B2 | 1/2020 | Cohen |
| 10,656,869 | B1 | 5/2020 | Greenwood |
| 10,810,054 | B1 | 10/2020 | Martinez Lerin |
| 11,720,269 | B1 * | 8/2023 | Baikov .................. G06F 9/5016 711/164 |
| 11,868,629 | B1 * | 1/2024 | Singh .................... G06F 3/0632 |
| 2004/0078376 | A1 | 4/2004 | Kusama |
| 2006/0282637 | A1 | 12/2006 | Yamauchi |
| 2008/0082726 | A1 | 4/2008 | Elhamias |
| 2009/0083511 | A1 | 3/2009 | Kanda |
| 2009/0272099 | A1 | 11/2009 | Garimella |
| 2009/0282088 | A1 | 11/2009 | Thomas |
| 2010/0042629 | A1 | 2/2010 | Fukatani |
| 2010/0211620 | A1 | 8/2010 | Matsuzawa |
| 2012/0017567 | A1 | 1/2012 | Geveci |
| 2012/0150764 | A1 | 6/2012 | Sadegh |
| 2012/0151120 | A1 | 6/2012 | Post |
| 2012/0221611 | A1 | 8/2012 | Watanabe |
| 2013/0179648 | A1 | 7/2013 | Yagame |
| 2014/0047208 | A1 | 2/2014 | Morse |
| 2015/0293815 | A1 | 10/2015 | Harel |
| 2016/0173603 | A1 | 6/2016 | Ainscow |
| 2016/0246812 | A1 | 8/2016 | Barajas Gonzalez |
| 2017/0060769 | A1 | 3/2017 | Wires |
| 2017/0160957 | A1 | 6/2017 | Thangaraj |
| 2017/0160976 | A1 | 6/2017 | Thangaraj |
| 2017/0374147 | A1 | 12/2017 | McNair |
| 2018/0150224 | A1 | 5/2018 | You |
| 2018/0262413 | A1 | 9/2018 | Sureka |
| 2019/0056877 | A1 | 2/2019 | Kolesnik |
| 2019/0073297 | A1 | 3/2019 | Goss |
| 2019/0121338 | A1 * | 4/2019 | Cella .................. G05B 19/4184 |
| 2019/0155698 | A1 | 5/2019 | Shekhar et al. |
| 2019/0294333 | A1 | 9/2019 | Zaidman |
| 2019/0332486 | A1 | 10/2019 | Aseev |
| 2020/0012443 | A1 | 1/2020 | Chen |
| 2020/0379670 | A1 * | 12/2020 | Zheng .................. G06F 3/0653 |
| 2020/0409588 | A1 | 12/2020 | Zaidman |
| 2021/0011830 | A1 | 1/2021 | Khokhar |
| 2021/0303631 | A1 * | 9/2021 | Grebenisan ........... G06F 16/906 |
| 2021/0334021 | A1 | 10/2021 | Devasigamony et al. |
| 2021/0357123 | A1 | 11/2021 | Kulkarni |
| 2022/0327498 | A1 * | 10/2022 | Panikkar ................ G06N 20/00 |

OTHER PUBLICATIONS

Dell EMC, "CloudIQ Detailed Review: A Proactive Monitoring and Analytics Application for Dell EMC Storage Systems," Technical White Paper, Jun. 2019, 63 pages.

Dell Technologies, "Dell EMC Unity: Best Practices Guide," Technical White Paper, Mar. 2020, 26 pages.

Dell EMC, "Dell EMC Unity: Introduction to the Platform," Technical White Paper, Dec. 2019, 25 pages.

QNAP Systems, Inc., Threshold Warning; How to Disable Threshold Warning from vol. Management, http://qnapsupport.net/threshold-warning-how-to-disable-threshold-warning-from-volume-managment/, Oct. 3, 2019, 8 pages.

* cited by examiner

| FILE SYSTEM IDENTIFIER | INPUT SHAPE | INITIAL RMSE | TUNED RMSE | INITIAL HYPERPARAMETERS | TUNED HYPERPARAMETERS |
|---|---|---|---|---|---|
| 1 | (9884, 100, 1) | 4.0779 | 0.0699 | EPOCH = 25; BATCH SIZE = 1; NEURON NUMBER = 100; DROPOUT = 0.37; ACTIVATION, TANH LEARNING RATE = 0.02 | EPOCH = 20; BATCH SIZE = 16; NEURON NUMBER = 50; DROPOUT = 0; ACTIVATION, RELU LEARNING RATE = 0.05 |
| 2 | (534, 100, 1) | 6.1295 | 0.1017 | EPOCH = 20; BATCH SIZE = 16; NEURON NUMBER = 50; DROPOUT = 0.31; ACTIVATION, RELU LEARNING RATE = 0.03 | EPOCH = 15; BATCH SIZE = 1; NEURON NUMBER = 100; DROPOUT = 0.14; ACTIVATION, RELU LEARNING RATE = 0.02 |
| 3 | (2215, 100, 1) | 58.8194 | 6.9292 | EPOCH = 15; BATCH SIZE = 5; NEURON NUMBER = 75; DROPOUT = 0.25; ACTIVATION, RELU LEARNING RATE = 0.01 | EPOCH = 20; BATCH SIZE = 1; NEURON NUMBER = 100; DROPOUT = 0.04; ACTIVATION, RELU LEARNING RATE = 0.03 |
| 4 | (10909, 100, 1) | 5.8235 | 2.2527 | EPOCH = 15; BATCH SIZE = 5; NEURON NUMBER = 75; DROPOUT = 0.5; ACTIVATION, TANH LEARNING RATE = 0.04 | EPOCH = 20; BATCH SIZE = 16; NEURON NUMBER = 100; DROPOUT = 0.1; ACTIVATION, TANH LEARNING RATE = 0.01 |

FIG. 3

AUTOMATIC FILE SYSTEM EXTENSION CLASSIFICATION RULES

| CONDITION LABEL | CONDITIONS/RULES |
|---|---|
| UTILIZATION IS PREDICTED TO EXPAND (FIG. 4A) | WHEN $U_0 < U_1 < U_2$: <br> IF $G_{au} > \frac{A_0 - U_1}{A_0}$ AND $Min_g < A_0 - U_1$, THEN SKIP AUTOMATIC FILE SYSTEM EXTENSION; <br><br> ELSE IF $U_1 < U_2$, EXTEND FILE SYSTEM TARGET SIZE |
| UTILIZATION IS PREDICTED TO EXPAND, BUT DECREASE IS EXPECTED (FIG. 4B) | IF $U_0 < U_1$ BUT $U_2 < U_1$; <br> THEN EXTEND FILE SYSTEM TARGET SIZE |
| UTILIZATION IS NOT PREDICTED TO EXPAND (FIG. 4C) | IF $U_0 > U_1$; <br> THEN SKIP AUTOMATIC FILE SYSTEM EXTENSION |

FIG. 5

AUTOMATIC FILE SYSTEM REDUCTION PROCESS 600

IF $P_{UTILIZATION\ LEVEL} \leq PWM$, THEN:

DISABLE AUTOMATIC FILE SYSTEM REDUCTION FOR ALL FILE SYSTEMS IN STORAGE POOL;

ELSE IF $P_{UTILIZATION\ LEVEL} > PWM$, THEN:

DETERMINE TARGET FILE SYSTEM REDUCTION SIZE BY COMPARING THE CURRENT UTILIZATION OF THE STORAGE CAPACITY TO THE PREDICTED UTILIZATION OF THE STORAGE CAPACITY (FIGS. 7A THROUGH 7D AND FIG. 8).

FIG. 6A

DYNAMIC STORAGE POOL WATERMARK LEVEL DETERMINATION PROCESS 650

$PWM = 75\%$ of $P_{SIZE}$; FOR $(0 < P_{SIZE} \leq 100T)$; OR $$PWM = 1 - \frac{25 + (P_{SIZE} - 100) * 25\% * \overline{\lg(P_{SIZE})}^2}{P_{SIZE}}, \text{ FOR } (P_{SIZE} > 100T),$$

UP TO $PWM_{MAX} = 90\%$ of $P_{SIZE}$.

FIG. 6B

AUTOMATIC FILE SYSTEM REDUCTION CLASSIFICATION RULES

| CONDITION LABEL | CONDITIONS/RULES |
|---|---|
| UTILIZATION IS PREDICTED TO DECREASE (FIG. 7A) | IF $U_0 > U_1 > U_2$, THEN FREE SPACE WILL BE RECLAIMED TO REDUCE THE FILE SYSTEM TARGET SIZE |
| UTILIZATION IS PREDICTED TO DECREASE, BUT EXPANSION BELOW CURRENT UTILIZATION IS EXPECTED (FIG. 7B) | IF $U_2 > U_1$ AND $U_0 > U_2$, THEN REDUCE THE FILE SYSTEM TARGET SIZE |
| UTILIZATION IS PREDICTED TO DECREASE, BUT EXPANSION BEYOND CURRENT UTILIZATION IS EXPECTED (FIG. 7C) | IF $U_0 < U_2$; THEN SKIP AUTOMATIC FILE SYSTEM REDUCTION |
| UTILIZATION IS PREDICTED TO INCREASE (FIG. 7D) | IF $U_0 < U_1$; THEN SKIP AUTOMATIC FILE SYSTEM REDUCTION |

FIG. 8

AUTOMATIC FILE SYSTEM CAPACITY MANAGEMENT USING FILE SYSTEM UTILIZATION PREDICTION

RELATED APPLICATION(S)

The present application claims priority to Chinese Patent Application No. 202211094372.6, filed Sep. 8, 2022, and entitled "Automatic File System Capacity Management Using File System Utilization Prediction," which is incorporated by reference herein in its entirety.

FIELD

The field relates generally to information processing techniques and more particularly, to the storage of information.

BACKGROUND

Storage arrays and other types of storage systems are often shared by multiple host devices over a network. Applications running on such host devices issue input-output (I/O) operations for delivery to the storage systems. A file system may be implemented in a storage system to organize and retrieve data stored in the storage system. For example, data may be stored in a file format and may be accessible using file names and/or addresses.

SUMMARY

In one embodiment, a method comprises obtaining input data representing a utilization of a storage capacity of a file system of a given storage system; predicting a future utilization of the storage capacity of the file system of the given storage system for one or more time periods based at least in part on at least a portion of the obtained input data; and automatically adjusting the storage capacity of the file system of the given storage system based at least in part on a result of a comparison of the predicted utilization of the storage capacity to a current utilization of the storage capacity.

In some embodiments, the one or more time periods correspond to a multiple step time window. The comparison of the predicted utilization of the storage capacity to a current utilization of the storage capacity may comprise comparing the current utilization of the storage capacity to the predicted utilization of the storage capacity for at least first and second time periods following a current time period to determine a trend of the utilization of the storage capacity of the file system.

Other illustrative embodiments include, without limitation, apparatus, systems, methods and computer program products comprising processor-readable storage media.

BRIEF DESCRIPTION OF THE DRAWINGS

FIG. 3 is a sample table illustrating a comparison of a performance of an initial model and a tuned model having hyperparameters tuned in accordance with an illustrative embodiment;

FIG. 5 is a sample table illustrating a number of exemplary automatic file system extension classification rules for performing an automatic file system extension based on the different file system utilization conditions of FIGS. 4A through 4C, in accordance with an illustrative embodiment;

FIG. 6A illustrates exemplary pseudo code for a process for performing an automatic file system reduction, in accordance with an illustrative embodiment;

FIG. 6B illustrates exemplary pseudo code for a process for determining a dynamic storage pool watermark level, in accordance with an illustrative embodiment;

FIG. 8 is a sample table illustrating a number of exemplary automatic file system reduction classification rules for performing an automatic file system reduction based on the different file system utilization conditions of FIGS. 7A through 7D, in accordance with an illustrative embodiment;

DETAILED DESCRIPTION

Figure 1:
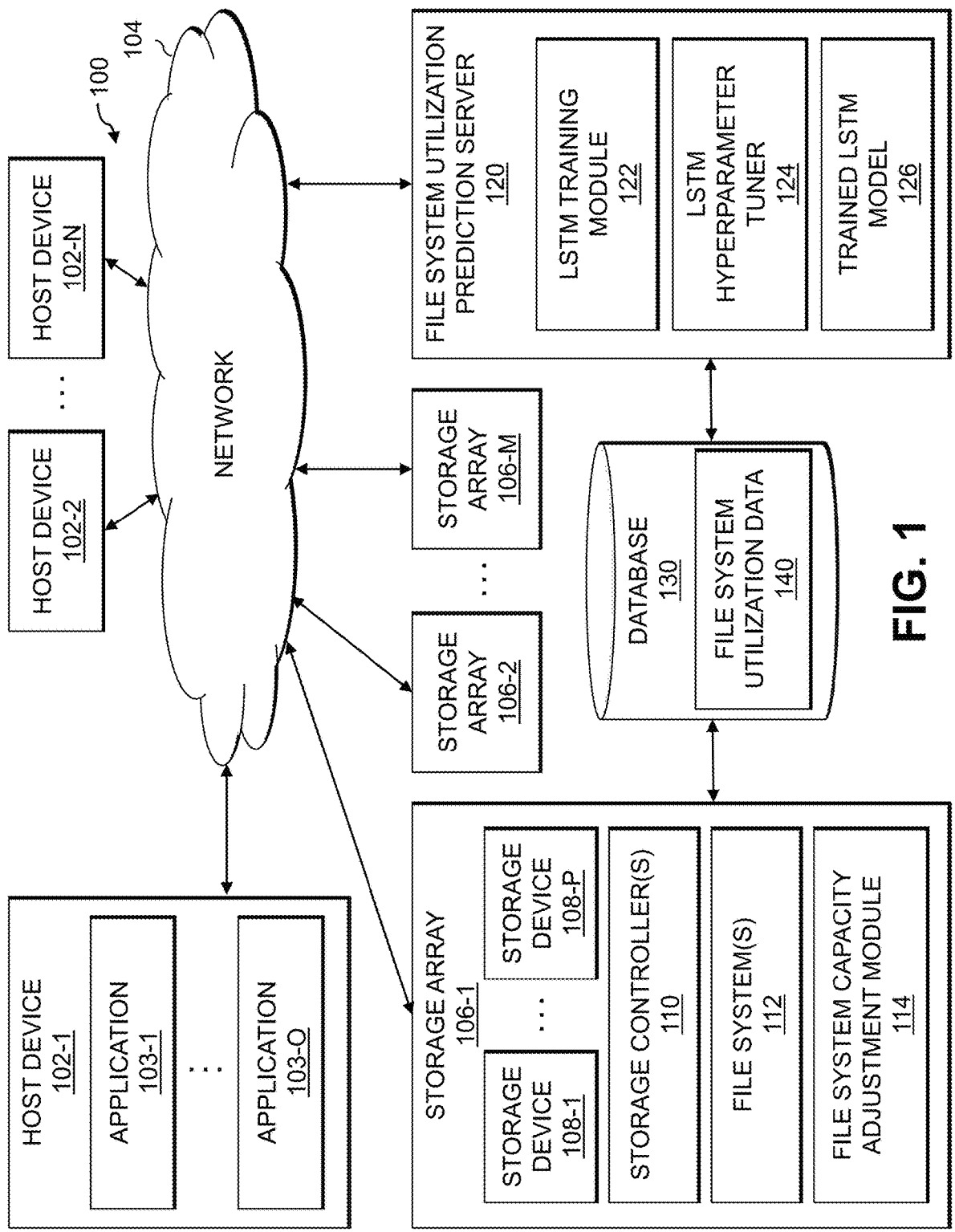
FIG. 1 shows an information processing system configured for automatic file system capacity management using file system utilization prediction, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automatic file system capacity management using file system utilization prediction.

As noted above, file systems may be implemented in a storage system to organize and retrieve data stored in the storage system. As the capacity utilization of the file system changes, the storage space allocated to the file system may also be changed. A number of technical problems are encountered with respect to when to perform such capacity management tasks, and the amount of such storage space allocation changes. It is often undesirable, for example, to expand and/or contract the allocated storage space too quickly (which may be referred to as storage space "shaking"). In addition, the capacity management tasks may also impair performance of the storage system by consuming storage system resources.

In one or more embodiments, techniques are provided for automatic file system capacity management using file system utilization prediction. A future utilization of the storage capacity of a file system can be predicted for one or more time periods based on real-time (e.g., current) utilization data of the storage capacity, as discussed further below. The storage capacity can be automatically adjusted based on a comparison of the predicted utilization to a current utilization of the storage capacity.

Typically, when a file system is first provisioned, a small amount of storage capacity is initially allocated to the file system, and then adjustments are made to the amount of allocated storage space based on a utilization of the allocated storage space by a customer. To improve the storage efficiency for customers, it is often important to have the amount of allocated storage space reasonably aligned with the utilization of the allocated storage space. Existing file system space management implementations may provide functionality for automatic file system extension (sometimes referred to as auto-extend) and/or automatic file system reduction (sometimes referred to as auto-shrink), whereby the amount of allocated storage space is automatically extended or reduced, respectively, based on capacity needs (e.g., based on a high water mark threshold (HWM) for automatic file system extension and a low water mark threshold (LWM) for automatic file system reduction). For example, the capacity of a file system can be automatically extended when the utilization of the allocated storage space exceeds and sustains over 75% of the allocated storage system. In addition, the capacity of the file system can be automatically reduced, for example, when the utilization of the allocated storage space falls below 70% of the allocated storage system. In some implementations, dynamic high-water mark and low-water mark thresholds may be employed.

A number of performance issues can be encountered when performing file system capacity management tasks in a storage system. For example, when portions of the storage system are reclaimed by the automatic file system reduction, data may be at least temporarily unavailable, during the reclamation and deallocation processes (for example, due to the extensive internal input/output operations that are typically performed to reduce the amount of storage system space allocated to the file system). In addition, the overall system availability may be reduced as the automatic file system reduction can be time consuming as additional locks may be used to avoid conflicts with other space management processes.

FIG. 1 shows an information processing system 100 configured in accordance with an illustrative embodiment. The information processing system 100 comprises a plurality of host devices 102-1, 102-2, . . . 102-N, collectively referred to herein as host devices 102, and a plurality of storage arrays 106-1, 106-2, . . . 106-M, collectively referred to herein as host storage arrays 106. The host devices 102 are configured to communicate with the storage arrays 106 over a network 104. The network 104 may comprise a storage area network (SAN). Also coupled to network 104 is one or more file system utilization prediction servers 120, discussed below.

The host devices 102 illustratively comprise servers or other types of computers of an enterprise computer system, cloud-based computer system or other arrangement of multiple compute nodes associated with respective users. Host device 102-1 is representative of one or more of the host devices 102. As shown in FIG. 1, the representative host device 102-1 executes one or more applications 103-1 through 103-0, collectively referred to herein as applications 103.

For example, the host devices 102 in some embodiments illustratively provide compute services such as execution of one or more applications 103 on behalf of each of one or more users associated with respective ones of the host devices. Such applications 103 illustratively generate I/O operations that are processed by the storage arrays 106. The term "input-output" as used herein refers to at least one of input and output. For example, I/O operations may comprise write requests and/or read requests directed to logical addresses of a particular storage array 106. These and other types of I/O operations are also generally referred to herein as I/O requests.

The host devices 102 and/or applications 103 are configured to interact over the network 104 with the storage arrays 106. Such interaction illustratively includes generating I/O operations, such as write and read requests, and sending such requests over the network 104 for processing by the storage arrays 106.

The exemplary storage array 106-1, as shown in FIG. 1, comprises a plurality of storage devices 108-1, . . . 108-P (collectively, referred to as storage devices 108) each storing data utilized by one or more of the applications 103 running on one or more of the host devices 102. The storage devices 108 are illustratively arranged in one or more storage pools. The storage array 106-1 also comprises one or more storage controllers 110 that facilitate I/O processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The storage array 106-1 also comprises a file system 112 that is used to organize and retrieve data stored in the storage devices 108. While it is called a file system in the example of FIG. 1, it is to be understood that data can be stored in accordance with file system 112 in various formats including, but not limited to, files, blocks and/or objects. Further, while file system 112 is shown as a separate block in storage array 106-1, it is to be appreciated that all or part of the file system 112 can be implemented as part of the storage controllers 110 and/or storage devices 108.

The storage array 106-1 implements a file system capacity adjustment module 114 configured to perform intelligent automatic file system extension and/or automatic file system reduction functionalities using file system utilization predictions with respect to the file system 112, as described herein. Although not explicitly shown in FIG. 1 for clarity of illustration, it is assumed in some embodiments that other ones of the storage arrays 106-2 through 106-M implement respective additional instances of a file system 112 and/or a file system capacity adjustment module 114, as well as respective sets of storage devices and storage controllers in a manner similar to that described herein with respect to storage array 106-1.

Further, although shown in FIG. 1 as being external to the storage controllers 110 and storage devices 108 of storage array 106-1, in other embodiments the file system capacity adjustment module 114 may be implemented at least partially within one or more of the storage controllers 110 and/or storage devices 108. For example, at least one of the storage controllers 110 may be implemented as a virtual storage controller running on an embedded hypervisor of the storage array 106-1. The file system capacity adjustment module 114 may be part of such a virtual storage controller, or may be implemented separate from the virtual storage controller on such an embedded hypervisor. Various other arrangements are possible, including where at least a portion of the functionalities of the file system capacity adjustment module 114 is implemented external to the storage array 106-1 (e.g., on one or more of the host devices 102, on a separate server, or on a cloud computing infrastructure). In alternative or additional embodiments, a single file system 112 may be used to organize and retrieve data from storage devices 108 on all or a subset of storage arrays 106-1, 106-2, . . . , 106-M, and a single file system capacity adjustment module 114 may be used to manage file system capacity across all or a subset of storage arrays 106-1, 106-2, . . . , 106-M.

At least portions of the functionalities of the file system capacity adjustment module 114 may be implemented at least in part in the form of software that is stored in memory and executed by a processor.

The storage array 106-1 in the present embodiment is assumed to comprise a persistent memory that is implemented using a flash memory or other type of non-volatile memory (NVM) of the storage array 106-1. Other types of NVM devices that can be used to implement at least a portion of the storage devices 108 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

These and various combinations of multiple different types of NVM devices may also be used. For example, hard disk drives (HDDs) can be used in combination with or in place of solid-state drives (SSDs) or other types of NVM devices in the storage array 106-1. Accordingly, numerous other types of electronic or magnetic media can be used in implementing at least a subset of the storage devices 108.

It is therefore to be appreciated that numerous different types of storage devices 108 can be used in storage array 106-1 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The storage arrays 106 in some embodiments may be implemented as part of a cloud-based system.

In some embodiments, at least one of the storage arrays 106 illustratively comprises one or more Unity™ or PowerMax™ storage arrays, as well as other commercially available storage arrays from Dell Technologies.

It should therefore be apparent that the term "storage array" as used herein is intended to be broadly construed, and may encompass multiple distinct instances of a commercially-available storage array. Other types of storage products that can be used in implementing a given storage system in illustrative embodiments include software-defined storage, cloud storage, object-based storage and/or scale-out storage. Combinations of multiple ones of these and other storage types can also be used in implementing a given storage system in an illustrative embodiment.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and/or write commands as well as other types of commands that are transmitted over the network 104. Such commands in some embodiments more particularly comprise Small Computer System Interface (SCSI) commands or Internet SCSI (iSCSI) commands, although other types of commands can be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

Although in some embodiments certain commands used by the host devices 102 to communicate with the storage array 106-1 illustratively comprise SCSI or iSCSI commands, other embodiments can implement I/O operations utilizing command features and functionality associated with NVM Express (NVMe). Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The file system utilization prediction server 120 may be implemented, for example, on the cloud or on the premises of an enterprise or another entity. In some embodiments, the file system utilization prediction server 120, or portions thereof, may be implemented as part of a host device that is distinct from the storage system (e.g., so as to prevent the disclosed techniques for automatic file system capacity management using file system utilization prediction from impairing the performance of the storage system) or as part of the storage system. As also depicted in FIG. 1, the file system utilization prediction server 120 further comprises a long short-term memory network (LSTM) training module 122, an LSTM hyperparameter tuner 124 and at least one trained LSTM model 126. In some embodiments, the LSTM training module 122 trains one or more LSTM models to generate the at least one trained LSTM model 126, as discussed further below in conjunction with FIG. 2, for example. The LSTM hyperparameter tuner 124 may optimize one or more hyperparameters of the at least one trained LSTM model 126, for example, by performing a Bayesian optimization to tune the hyperparameters to obtain accurate and stable prediction data. The Bayesian optimization may specify a range of values for each hyperparameter, select a metric to optimize (e.g., root mean square error or another error metric), and search for a particular combination of hyperparameter values that optimize the selected metric.

One or more aspects of the disclosure recognize that LSTM models perform well for time-series forecasting with high accuracy. It has been found that when an LSTM model is trained with different file system utilization data (sometimes referred to as file system usage data) from multiple storage arrays, the trained LSTM model reliably generates multiple step predictions of the utilization data with different ranges and patterns of real utilization data. In some embodiments, the file system utilization forecast is treated as a univariate time-series predictive modeling problem, whereby the historical file system storage utilization data provides the input variable, while the future predictions of the storage utilization data provide the output variable. LSTM models automatically learn one or more features related to the file system utilization data and output a variable length sequence that can be used for multi-step forecasting.

It is to be appreciated that this particular arrangement of elements 122, 124 and 126 illustrated in the file system utilization prediction server 120 of the FIG. 1 embodiment is presented by way of example only, and alternative arrangements can be used in other embodiments. For example, the functionality associated with elements 122, 124 and 126 in other embodiments can be combined into a single element, or separated across a larger number of elements. As another example, multiple distinct processors can be used to implement different ones of elements 122, 124 and 126 or portions thereof.

At least portions of elements 122, 124 and 126 may be implemented at least in part in the form of software that is stored in memory and executed by a processor. An exemplary process utilizing elements 122, 124 and 126 of an example file system utilization prediction server 120 in information processing system 100 will be described in more detail with reference to, for example, FIGS. 2 through 9.

Additionally, the file system utilization prediction server 120 can have an associated database 130 configured to store, for example, file system utilization data 140 related to one or more file systems, such as the file system 112. For example, the file system utilization data 140 related to one or more file systems may comprise the storage utilization data of the file system 112 at a defined time step (e.g., every minute) which can be used by the LSTM training module 122 of the file system utilization prediction server 120 to train an LSTM model (e.g., every 8 hours). The collected data will be transferred to the file system utilization prediction server 120 for the LSTM training.

The database 130 in the present embodiment is implemented using one or more storage systems associated with the file system utilization prediction server 120. Such storage systems can comprise any of a variety of different types of storage such as, network-attached storage (NAS), SANs, direct-attached storage (DAS) and distributed DAS, as well as combinations of these and other storage types, including software-defined storage.

The host devices 102, storage arrays 106 and/or file system utilization prediction server 120 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and/or the file system utilization prediction server 120 may be implemented on respective distinct processing platforms, although numerous other arrangements are possible. For example, in some embodiments at least portions of the host devices 102, the storage arrays 106 and/or the file system utilization prediction server 120 are implemented on the same processing platform. One or more of the storage arrays 106, for example, can therefore be implemented at least in part within at least one processing platform that implements at least a subset of the host devices 102 and/or the file system utilization prediction server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, storage arrays 106 and/or file system utilization prediction server 120 to reside in different data centers. Numerous other distributed implementations of the host devices and the storage array 106-1 are possible.

Additional examples of processing platforms utilized to implement host devices 102, storage arrays 106 and/or the file system utilization prediction server 120 in illustrative embodiments will be described in more detail below in conjunction with FIGS. 10 and 11.

In one or more embodiments, the disclosed techniques for automatic file system capacity management using file system utilization prediction are illustratively performed at least in part by the storage controller 110, file system capacity adjustment module 114 and/or the file system utilization prediction server 120 in a manner to be described in more detail elsewhere herein.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect storage system components. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Other types of storage products that can be used in implementing a given storage system in illustrative embodiments include software-defined storage, cloud storage, object-based storage, clustered storage systems and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

It is to be appreciated that these and other features of illustrative embodiments are presented by way of example only, and should not be construed as limiting in any way.

Accordingly, different numbers, types and arrangements of system components such as host devices 102, storage arrays 106, network 104, file system utilization prediction server 120 and database 130, or portions thereof, can be used in other embodiments.

It should be understood that the particular sets of modules, elements and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
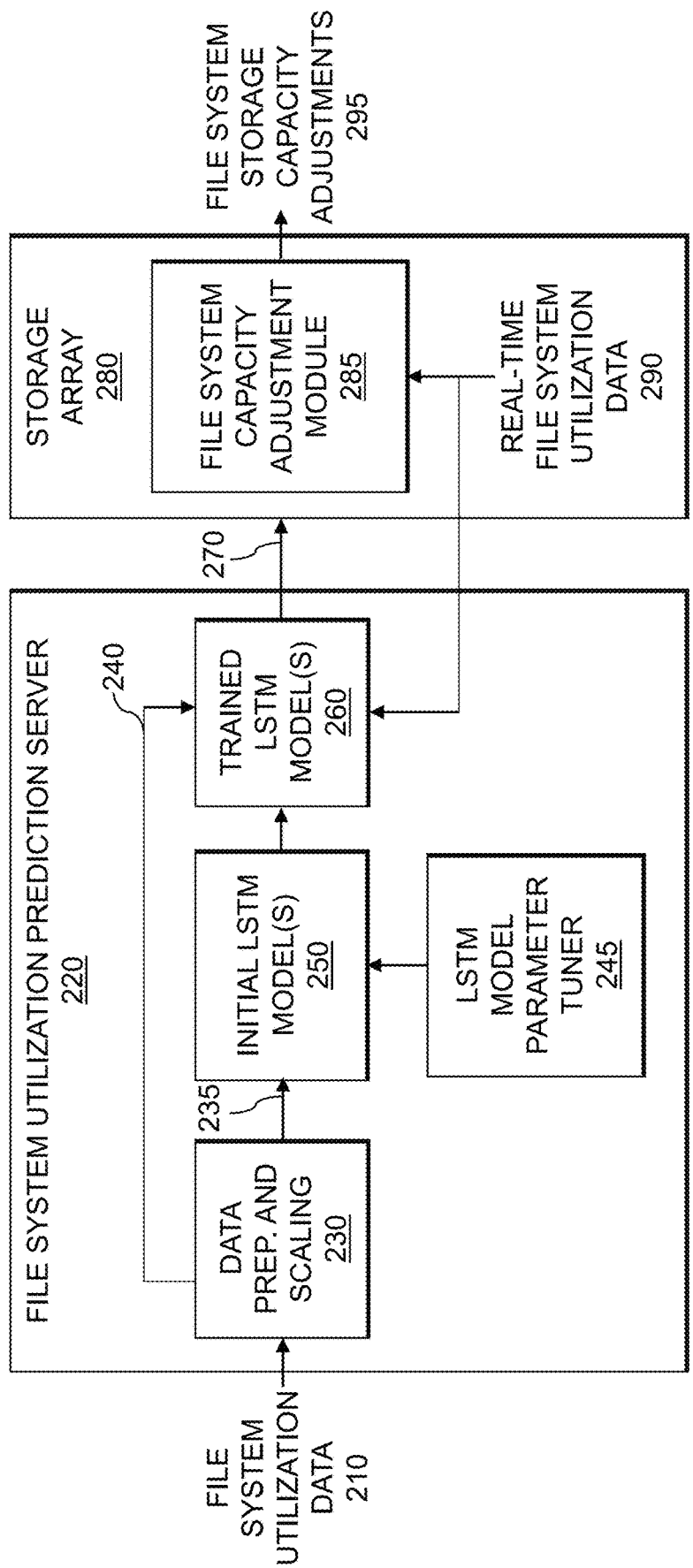
FIG. 2 illustrates a determination of one or more storage capacity adjustments for a file system using multi-step predictions of file system utilization, in accordance with an illustrative embodiment.

FIG. 2 illustrates a determination of one or more file system storage capacity adjustments 295 for a file system using multi-step file system utilization predictions 270, in accordance with an illustrative embodiment. In the example of FIG. 2, file system utilization data 210 (e.g., historical file system utilization data 210) is applied to a data preparation and scaling module 230, in a training phase, that pre-processes the file system utilization data 210 (e.g., historical usage data) to make the file system utilization data 210 suitable for training one or more LSTM models.

As noted above, the file system utilization data 210 may comprise the storage utilization data of the file system 112 (e.g., the file system utilization data 140 from database 130) that is collected, for example, at a defined time step (e.g., every minute). The data preparation and scaling module 230 separates the pre-processed file system utilization data 210 to generate (i) training and validation data 235, that is applied to one or more initial LSTM models 250 to train and validate, respectively, the one or more initial LSTM models 250, and (ii) test data 240 that is applied to one or more trained LSTM models 260 generated by the training phase. For example, the training dataset may comprise 80% of the file system utilization dataset. In addition, the data preparation and scaling module 230 may scale the values within a range of 0 and 1, for example, using a minimum-maximum scaler (sometimes referred to as a MinMax scaler). In at least one embodiment, the training can be performed and updated, for example, by the LSTM training module 122 of the file system utilization prediction server 120 of FIG. 1 every eight hours.

In the embodiment of FIG. 2, an LSTM model parameter tuner 245 (e.g., a hyperparameter tuner) tunes one or more hyperparameters of the one or more initial LSTM models 250 during the training phase, for example, using a Bayesian optimization, as discussed further below in conjunction with FIG. 3.

In a prediction phase, real-time file system utilization data 290 of a storage array 280 is applied to the one or more exemplary trained LSTM models 260 to generate multi-step file system utilization predictions 270 of the file system utilization, as discussed further below in conjunction with FIGS. 4A through 4C. The real-time file system utilization data 290 may comprise, for example, file system utilization data in a recent time window and/or file system utilization data that precedes one or more time windows for which a file system utilization prediction is desired. The real-time file system utilization data 290 may also be applied in some embodiments to the data preparation and scaling module 230 (or another pre-processing module), in the prediction phase, that pre-processes the real-time file system utilization data 290 to make the real-time file system utilization data 290 suitable for processing by the trained LSTM models 260. Thus, the file system utilization data 210 may comprise the real-time file system utilization data 290 in some embodiments.

As noted above, the multi-step file system utilization predictions 270 may be stored in the database 130 to be accessed by a file system capacity adjustment module 285 of the storage array 280 for performing the disclosed prediction-based file system capacity management techniques. In at least some embodiments, the multi-step file system utilization predictions 270 comprise two-step utilization predictions and the file system capacity adjustment module 285 compares the two-step utilization predictions generated by the one or more exemplary trained LSTM models 260 to the real-time file system utilization data 290 to determine one or more file system storage capacity adjustments 295 (e.g., by evaluating a trend of the file system utilization), as discussed further below, for example, in conjunction with FIGS. 4A through 4C and 7A through 7D.

As discussed further below, the file system capacity adjustment module 285 implements the disclosed automatic file system capacity management techniques to determine how much of an adjustment, if any, to make to the file system storage capacity for each time step in some embodiments using the real-time file system utilization data 290 for the current time step and the two-step utilization predictions generated by the one or more exemplary trained LSTM models 260 for the two time steps following the current time step. As used herein, the current utilization of the storage capacity may be to be a utilization of the storage capacity for a current time or the utilization of the storage capacity for a time period currently of interest (which is not necessarily a current time), such as a time period currently being processed, as would be apparent to a person of ordinary skill in the art.

Among other benefits, the LSTM models are trained and utilized to generate the multi-step file system utilization predictions 270 of file system utilization by the separate file system utilization prediction server 220 in the example of FIG. 2, for example, and not by the storage array 280 so that the performance of the storage array 280 is not impaired.

FIG. 3 is a sample table 300 illustrating a comparison of a performance of an initial LSTM model and a tuned LSTM model having hyperparameters tuned in accordance with an illustrative embodiment. In the example of FIG. 3, the sample table 300 comprises, for each file system, a file system identifier, an input shape, an initial RMSE (root mean square error) for an initial LSTM model, a tuned RMSE for a tuned LSTM model, an initial set of hyperparameters for the initial LSTM model and a tuned set of hyperparameters for the tuned LSTM model.

As noted above, the file system utilization prediction server 220 of FIG. 2 trains one or more initial LSTM models 250 to generate at least one trained LSTM model 260. The LSTM model parameter tuner 245 may optimize one or more hyperparameters of the at least one trained LSTM model 260, for example, by performing a Bayesian optimization to tune the hyperparameters to obtain accurate and stable prediction data.

In at least some embodiments, an LSTM model processes a three-dimensional input. The three dimensions of the input comprise (i) data samples (e.g., file system utilization data, where one sequence is one sample and a batch is comprised of one or more samples); (ii) time steps (where one time step is one point of observation in the data sample); and (iii) features (where one feature is one observation at a time step). In the first row of the example of FIG. 3, for example, the input shape "9884, 100, 1" indicates that there are 9884 collected samples for 100 time steps applied to the input layer of the LSTM model and there is only one feature in each time step (e.g., file system utilization data).

In the example of FIG. 3, the set of hyperparameters that are tuned comprise the number of epochs; batch size; neuron number; dropout; activation and learning rate. The number of epochs indicates the number of times that the training data is applied to the LSTM network while training. The batch size is the number of sub-samples given to the LSTM network before the parameter update is performed. The number of neurons indicates the number of neurons in every hidden layer of the LSTM network. The number of neurons in every layer is set to be the same in at least one embodiment (but it can be different). The number of neurons should be adjusted to the solution complexity, as would be apparent to a person of ordinary skill in the art (e.g., a task with a more complex level to predict needs additional neurons). The number of neurons can be set in a range of 10 to 100. The learning rate defines how quickly an LSTM network updates its parameters (e.g., a low learning rate slows down the learning process but converges smoothly, while a larger learning rate speeds up the learning but may not converge). The dropout is a regularization technique to avoid overfitting the LSTM model (e.g., increase the validation accuracy) thus increasing the generalizing power. Activation functions may be used to introduce nonlinearity to LSTM models, which allows deep learning models to learn nonlinear prediction boundaries.

Figure 4C:
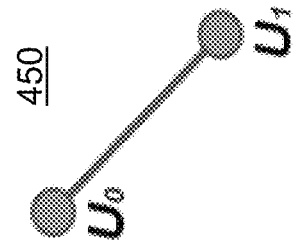
FIGS. 4A through 4C illustrate a number of different file system utilization conditions for performing an automatic file system extension, in accordance with an illustrative embodiment.
Figure 4B:
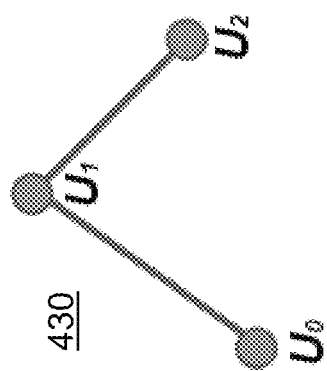
Figure 4A:
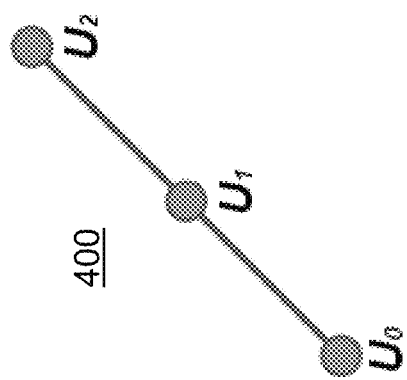

FIGS. 4A through 4C illustrate a number of different file system utilization conditions 400, 430, 450, respectively, for performing an automatic file system extension, in accordance with an illustrative embodiment. As noted above, in some embodiments, the multi-step file system utilization predictions 270 generated by the one or more trained LSTM models 260 in the example of FIG. 2 comprise two-step file system utilization predictions ($U_1$ and $U_2$) and the file system capacity adjustment module 285 compares the two-step utilization predictions generated by the one or more exemplary trained LSTM models 260 (e.g., for two future time steps) to a real-time file system utilization data 290 ($U_0$) for a current time step to determine one or more file system storage capacity adjustments 295 (e.g., by evaluating a trend of the file system utilization).

In the example of FIG. 4A, the current file system utilization $U_0$ is lower than the first-step utilization prediction $U_1$, which is also lower than the second-step utilization prediction $U_2$, indicating that the file system utilization is predicted to expand. In the example of FIG. 4B, the current file system utilization $U_0$ is lower than the first-step utilization prediction $U_1$, which is greater than the second-step utilization prediction $U_2$, indicating that the file system utilization is predicted to expand but a decrease is expected. In the example of FIG. 4C, the current file system utilization $U_0$ is greater than the first-step utilization prediction $U_1$, indicating that the file system utilization is predicted to decrease (e.g., shrink).

FIG. 5 is a sample table 500 illustrating a number of exemplary automatic file system extension classification rules for performing an automatic file system extension based on the different file system utilization conditions 400, 430, 450 of FIGS. 4A through 4C, in accordance with an illustrative embodiment. In the example of FIG. 5, the exemplary automatic file system extension classification rules employ (i) a gap threshold ($G_{au}$) based on a gap (e.g., a difference) between the allocated storage space and the utilized storage space to control the target size for file system capacity management (for example, $G_{au}$ may have a default value of 10%), and (ii) a minimum gap threshold ($Min_g$) between the allocated storage space and the utilized storage space (for example, $Min_g$ may have a default value of 10 GBs).

A first automatic file system extension classification rule corresponds to the file system condition associated with FIG. 4A, where the file system utilization is predicted to expand. As shown by the corresponding condition, the file system utilization is predicted to expand when $U_0<U_1<U_2$. In this case, the automatic extension of the file system is skipped when $G_{au}$ and $Min_g$ satisfy the following conditions:

$$G_{au} > \frac{A_0 - U_1}{A_0} \text{ and } Min_g < A_0 - U_1.$$

where $A_i$ is the allocated size of the file system at time step i.

Otherwise, when $G_{au}$ exceeds the difference between $A_0$ (the current allocated storage space) and $U_1$, or when the difference between $A_0$ and $U_1$ exceeds $Min_g$, the file system capacity adjustment module 114 will evaluate the multi-step file system utilization predictions 270 to determine an amount of the target size extension for an automatic extension of the file system, as follows:

$$\text{TARGET\_SIZE\_EXTENSION} = \text{MIN}\left(U_1 \times (1 + G_{au}) \times \frac{\Delta U_2}{\Delta U_1},\ U_2\right).$$

A second automatic file system extension classification rule corresponds to the file system condition associated with FIG. 4B, where the file system utilization is predicted to expand but a subsequent decrease is expected. As shown by the corresponding condition, the file system utilization is predicted to expand and then decrease when $U_0 < U_1$ but $U_2 < U_1$. In this case, the automatic extension of the file system is performed based on the following target size extension:

TARGET_SIZE_EXTENSION=MIN($U_1 \times (1+G_{au})$, $U_1+\text{Min}_g$).

A third automatic file system extension classification rule corresponds to the file system condition associated with FIG. 4C, where the file system utilization is not predicted to expand. As shown by the corresponding condition, the file system utilization is not predicted to expand when $U_0 > U_1$. In this case, the automatic extension of the file system is skipped.

As noted above, a watchdog, for example, can be enabled to check the utilization of the file system space every two minutes to determine whether an automatic extension of the file system should be triggered.

FIG. 6A illustrates exemplary pseudo code for a process for performing an automatic file system reduction, in accordance with an illustrative embodiment. In the example of FIG. 6A, the automatic file system reduction process 600 compares the current utilization of the storage pool, $P_{UTILIZATION\ LEVEL}$, to a storage pool watermark, PWM, determined, for example, by a dynamic storage pool watermark level determination process 650, as discussed further below in conjunction with FIG. 6B. The automatic file system reduction process 600 uses a result of the comparison to determine whether the allocated size of the storage pool should be reduced.

When $P_{UTILIZATION\ LEVEL}$ is less than or equal to PWM, the automatic file system reduction process 600 will disable the automatic file system reduction for all file systems in the storage pool.

When $P_{UTILIZATION\ LEVEL}$ is greater than PWM, the automatic file system reduction process 600 will determine the target file system reduction size by comparing the current utilization of the storage capacity of the file system to the predicted utilization of the storage capacity of the file system, as discussed further below in conjunction with FIGS. 7A through 7D and FIG. 8.

FIG. 6B illustrates exemplary pseudo code for a process for determining a dynamic storage pool watermark level, in accordance with an illustrative embodiment. In the example of FIG. 6B, the dynamic storage pool watermark level determination process 650 sets PWM to a value of 75% of the storage pool size, $P_{SIZE}$, when $P_{SIZE}$ is less than or equal to a threshold, such as 100 terabytes. The dynamic storage pool watermark level determination process 650 sets PWM to the following value, when $P_{SIZE}$ is greater than the threshold (e.g., 100 terabytes):

$$PWM = 1 - \frac{25 + (P_{SIZE} - 100) * 25\% * \frac{2}{\lg(P_{SIZE})}}{P_{SIZE}}.$$

The exemplary dynamic storage pool watermark level determination process 650, however, will not set PWM to a value greater than 90% of $P_{SIZE}$, by virtue of the final rule shown in FIG. 6B. The particular percentage amounts (e.g., 75% and 90%), storage thresholds (e.g., 100 terabytes) and PWM upper limit specified in the example of FIG. 6B may be configurable in some embodiments, and may have different values for different file systems in other embodiments, as would be apparent to a person of ordinary skill in the art.

FIGS. 7A through 7D illustrate a number of different file system utilization conditions 700, 730, 750, 770, respectively, for performing an automatic file system reduction, in accordance with an illustrative embodiment. In some embodiments, the disclosed techniques for automatic file system reduction try to avoid the unnecessary space reclamation evaluation checking the status of the storage pool relative to the predicted space utilization for two-time steps.

As noted above, in some embodiments, the multi-step file system utilization predictions 270 generated by the one or more trained LSTM models 260 of FIG. 2 comprise two-step utilization predictions ($U_1$ and $U_2$) and the file system capacity adjustment module 285 compares the two-step utilization predictions generated by the one or more exemplary trained LSTM models 260 to real-time file system utilization data 290 for a current time ($U_0$) to determine one or more file system storage capacity adjustments 295 (e.g., by evaluating a trend of the file system utilization).

Figure 7A:
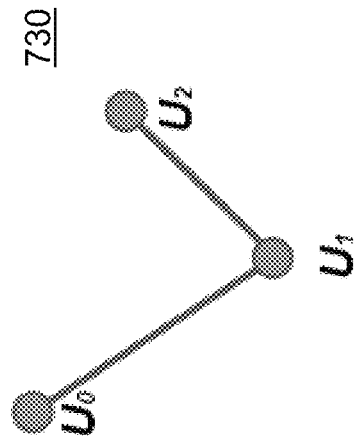
FIGS. 7A through 7D illustrate a number of different file system utilization conditions for performing an automatic file system reduction, in accordance with an illustrative embodiment.
Figure 7B:
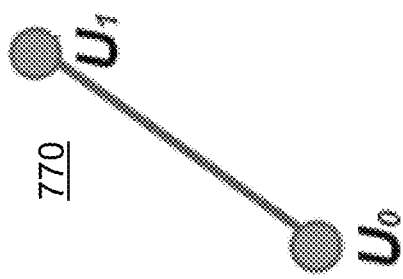
Figure 7C:
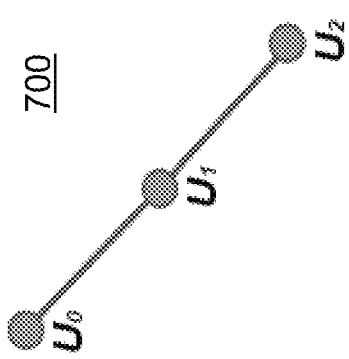
Figure 7D:
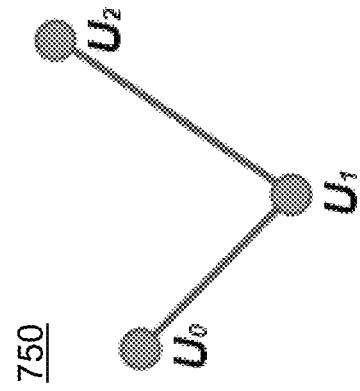

In the example of FIG. 7A, the current file system utilization $U_0$ is greater than the first-step utilization prediction $U_1$, which is also greater than the second-step utilization prediction $U_2$, indicating that the file system utilization is predicted to decrease (e.g., shrink). In the example of FIG. 7B, the current file system utilization $U_0$ is greater than the first-step utilization prediction $U_1$, which is lower than the second-step utilization prediction $U_2$, indicating that the file system utilization is predicted to decrease but expansion below the current utilization is expected. In the example of FIG. 7C, the current file system utilization $U_0$ is greater than the first-step utilization prediction $U_1$, but the second-step utilization prediction $U_2$ is greater than the current file system utilization $U_0$, indicating that the file system utilization is predicted to decrease and that expansion beyond the current utilization is expected. In the example of FIG. 7D, the current file system utilization $U_0$ is less than the first-step utilization prediction $U_1$, indicating that the file system utilization is predicted to increase (e.g., expand).

FIG. 8 is a sample table 800 illustrating a number of exemplary automatic file system reduction classification rules for performing an automatic file system reduction based on the different file system utilization conditions 700, 730, 750, 770, of FIGS. 7A through 7D, respectively, in accordance with an illustrative embodiment. In the example of FIG. 8, the exemplary automatic file system reduction rules employ (i) $G_{au}$, and (ii) $\text{Min}_g$, in a similar manner as the automatic file system extension classification rules of FIG. 5.

A first automatic file system reduction classification rule corresponds to the file system condition associated with FIG. 7A, where the file system utilization is predicted to decrease. As shown by the corresponding condition, the file system utilization is predicted to decrease when $U_0 > U_1 > U_2$. In this case, free space will be reclaimed to the extent possible by reducing the file system target size to the following reduced target value:

TARGET_SIZE_REDUCTION=MIN($U_1 \times (1+G_{au})$, $U_1+\text{Min}_g$).

A second automatic file system reduction classification rule corresponds to the file system condition associated with FIG. 7B, where the file system utilization is predicted to decrease, but an expansion beyond the current utilization is expected. As shown by the corresponding condition, the file system utilization is predicted to decrease, but an expansion below the current utilization is expected, when $U_2 > U_1$ and $U_0 > U_2$. In this case, the automatic reduction of the file system is performed based on the following file system target size reduction (e.g., to avoid shaking):

TARGET_SIZE_REDUCTION=MIN($U_2 \times (1+G_{au})$, $U_2+\text{Min}_g$).

A third automatic file system reduction classification rule corresponds to the file system condition associated with FIG. 7C, where the file system utilization is predicted to decrease, but an expansion beyond the current utilization is expected. As shown by the corresponding condition, the file system utilization is predicted to decrease, but an expansion beyond the current utilization is expected, when $U_0 < U_2$. In this case, the automatic file system reduction of the file system is skipped.

A fourth automatic file system reduction classification rule corresponds to the file system condition associated with FIG. 7D, where the file system utilization is predicted to increase. As shown by the corresponding condition, the file system utilization is predicted to decrease, but an expansion beyond the current utilization is expected, when $U_0 < U_1$. In this case, the automatic reduction of the file system is also skipped.

Figure 9:
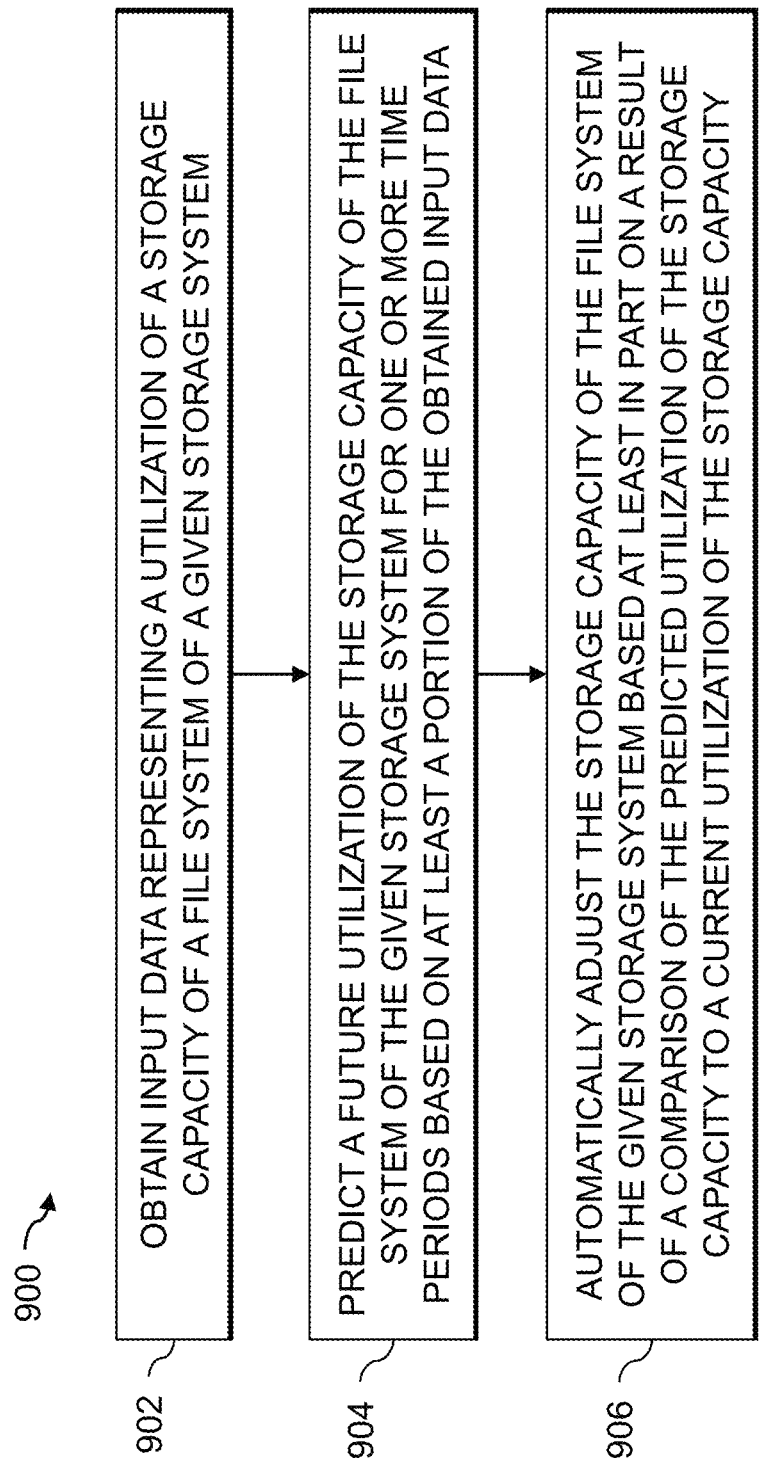
FIG. 9 is a flow chart illustrating an exemplary implementation of a process for automatic file system capacity management using file system utilization prediction, in accordance with an illustrative embodiment.

FIG. 9 is a flow chart illustrating an exemplary implementation of a process 900 for automatic file system capacity management using file system utilization prediction, in accordance with an illustrative embodiment. In the example of FIG. 9, the process 900 initially obtains input data in step 902 representing a utilization of a storage capacity of a file system of a given storage system.

A future utilization of the storage capacity of the file system of the given storage system is predicted in step 904 for one or more time periods based at least in part on at least a portion of the obtained input data. In step 906, the storage capacity of the file system of the given storage system is automatically adjusted based at least in part on a result of a comparison of the predicted utilization of the storage capacity to a current utilization of the storage capacity.

In one or more embodiments, the prediction is performed using a trained long short-term memory network. A Bayesian optimization may be performed to tune one or more hyperparameters of a long short-term memory network to obtain the trained long short-term memory network.

In some embodiments, the one or more time periods correspond to a multiple step time window. For example, the comparison of the predicted utilization of the storage capacity to a current utilization of the storage capacity comprises comparing the current utilization of the storage capacity to the predicted utilization of the storage capacity for at least first and second time periods following a current time period to determine a trend of the utilization of the storage capacity of the file system.

A size of the storage capacity of the file system may be extended by a first extension amount in response to the predicted utilization of the storage capacity for the second time period exceeding the predicted utilization of the storage capacity for the first time period and (ii) the predicted utilization of the storage capacity for the first time period exceeding the current utilization of the storage capacity for the current time period. The size of the storage capacity of the file system may also be extended by a second extension amount in response to (i) the predicted utilization of the storage capacity for the first time period exceeding the current utilization of the storage capacity for the current time period and (ii) the predicted utilization of the storage capacity for the first time period exceeding the predicted utilization of the storage capacity for the second time period, wherein the second extension amount is less than the first extension amount.

The extension of the storage capacity of the file system by the first extension amount may be prevented in response to (a) a difference between (i) a current allocated storage capacity for the current time period and (ii) a predicted utilization of the storage capacity for the first time period being less than a first gap threshold; and (b) the difference between (i) the current allocated storage capacity for the current time period and (ii) the predicted utilization of the storage capacity for the first time period being above a second gap threshold.

A size of the storage capacity of the file system may be reduced by a first reduction amount in response to (i) the current utilization of the storage capacity for the current time period exceeding the predicted utilization of the storage capacity for the first time period and (ii) the predicted utilization of the storage capacity for the first time period exceeding the predicted utilization of the storage capacity for the second time period. The size of the storage capacity of the file system may also be reduced by a second reduction amount in response to (i) the predicted utilization of the storage capacity for the second time period exceeding the predicted utilization of the storage capacity for the first time period and (ii) the current utilization of the storage capacity for the current time period exceeding the predicted utilization of the storage capacity for the second time period, wherein the second reduction amount is less than the first reduction amount.

The particular processing operations and other network functionality described in conjunction with the pseudo code of FIGS. 6A, 6B and the flow diagram of FIG. 9, for example, are presented by way of illustrative example only, and should not be construed as limiting the scope of the disclosure in any way. Alternative embodiments can use other types of processing operations to automatically manage file system capacity using file system utilization prediction. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In addition, while one or more exemplary embodiments implement at least portions of the disclosed prediction-based file system capacity management functionality in the storage array 106-1, in one or more alternate embodiments, at least a portion of the disclosed prediction-based file system capacity management functionality may be implemented in one or more of the host devices 102, or on another dedicated device. For example, as noted above, in at least some embodiments, the training, maintenance (e.g., updated training) and use of the LSTM models may be performed in the file system utilization prediction server 120 (thus, reducing or avoiding any performance impairment to the storage arrays as a result of the disclosed prediction-based file system capacity management functionality).

The disclosed techniques for automatic file system capacity management using file system utilization prediction improve the storage efficiency by assigning reasonable target sizes for automated file system capacity reduction and expansion. In addition, some embodiments evaluate a utilization of the storage pool for additional improvements to the file system space capacity management functionality. For example, shaking behavior may be reduced between the automated file system capacity reduction and capacity expansion by skipping unnecessary file system capacity adjustments. As noted above, the LSTM models used in at least some embodiments have been found to provide utilization predictions with high accuracy.

It has been found that the disclosed techniques for automatic file system capacity management using file system utilization predictions demonstrate reduced gaps between an allocated size of a file system and an updated target size of the file system. In addition, the shaking effect on future time periods (e.g., time period 5) is largely avoided.

It should also be understood that the disclosed prediction-based file system capacity management techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatic file system capacity management using file system utilization prediction may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based prediction-based file system capacity management engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based prediction-based file system capacity management platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
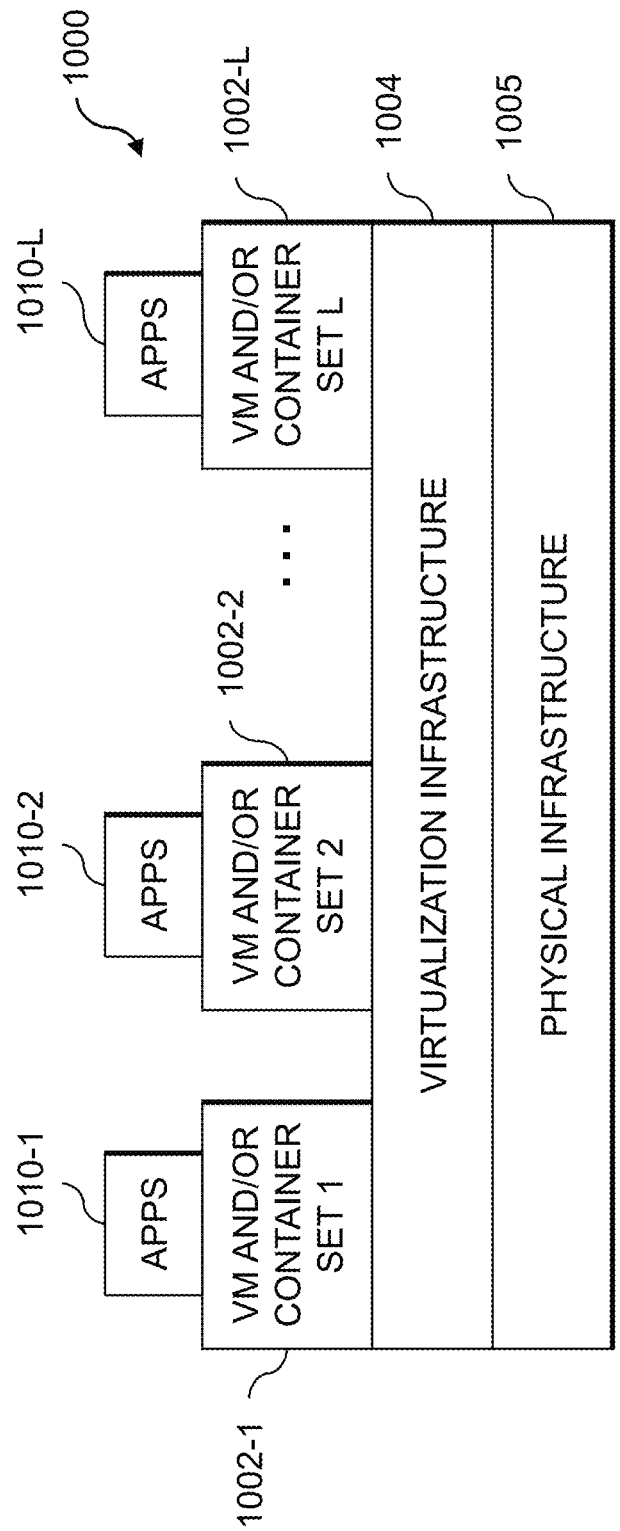
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple VMs and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide prediction-based file system capacity management functionality of the type described above for one or more processes running on a given one of the VMs. For example, each of the VMs can implement prediction-based file system capacity management control logic and associated file system utilization monitoring for providing prediction-based file system capacity management functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide prediction-based file system capacity management functionality of the type described above for one or more processes running on different ones of the containers. For example, a container host device supporting multiple containers of one or more container sets can implement one or more instances of prediction-based file system capacity management control logic and associated file system utilization monitoring for providing prediction-based file system capacity management functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
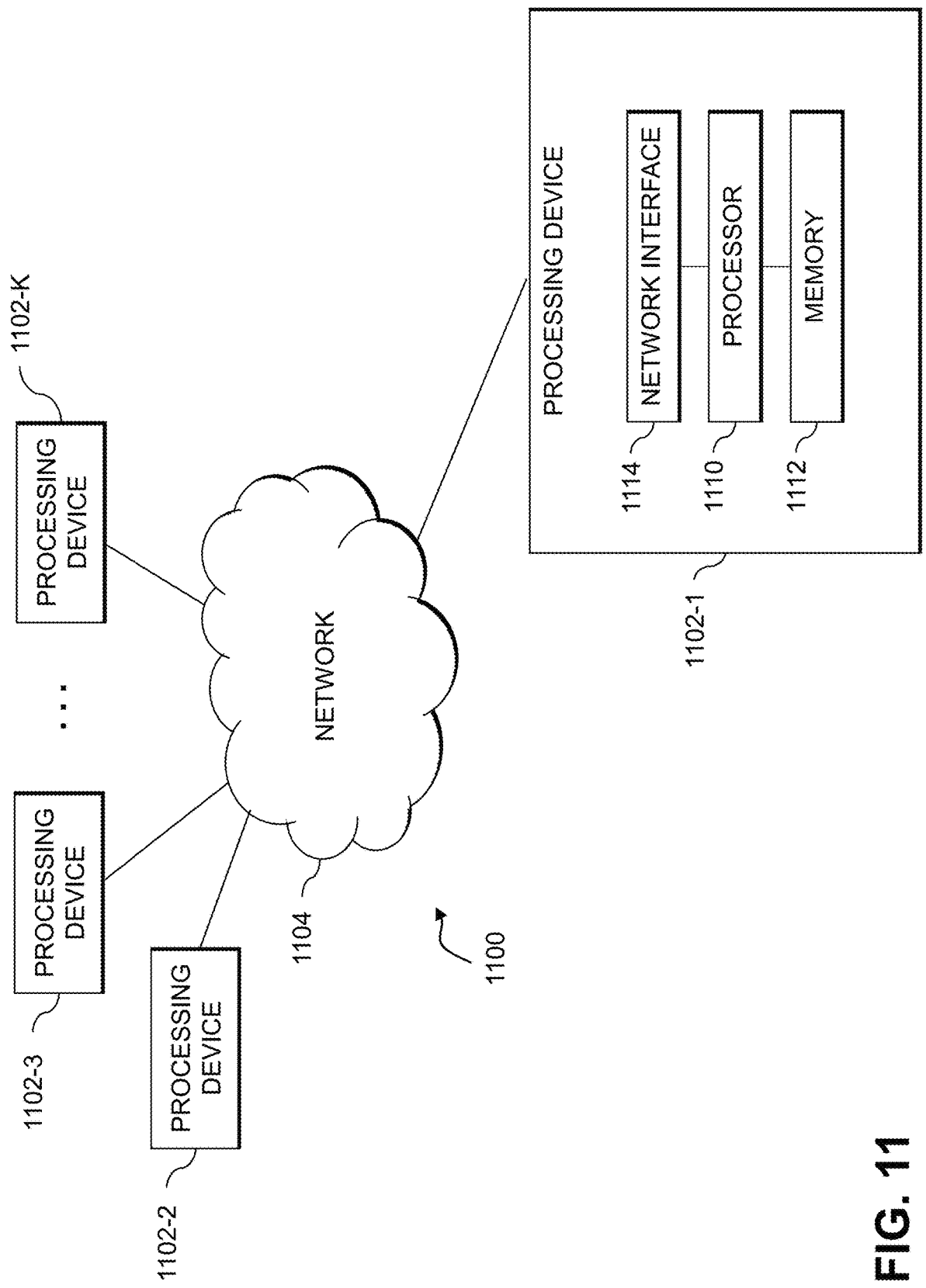
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining input data representing a utilization of a storage capacity of a file system of a given storage system;
predicting a future utilization of the storage capacity of the file system of the given storage system for one or more time periods based at least in part on at least a portion of the obtained input data;
automatically adjusting the storage capacity of the file system of the given storage system based at least in part on a result of a comparison of the predicted future utilization of the storage capacity to a current utilization of the storage capacity, wherein a size of the storage capacity of the file system is extended by a first extension amount in response to the predicted future utilization of the storage capacity for a second time period exceeding a predicted future utilization of the storage capacity for a first time period and the predicted future utilization of the storage capacity for the first time period exceeding the current utilization of the storage capacity; and
storing one or more objects in the file system of the given storage system, during at least one of the one or more time periods, using the adjusted storage capacity;
wherein the method is performed by at least one processing device comprising a processor coupled to a memory.

2. The method of claim 1, wherein the prediction is performed using a trained long short-term memory network.

3. The method of claim 2, wherein a Bayesian optimization is performed to tune one or more hyperparameters of a long short-term memory network to obtain the trained long short-term memory network.

4. The method of claim 1, wherein the one or more time periods correspond to a multiple step time window.

5. The method of claim 1, wherein the first and second time periods follow a current time period, and wherein the comparison determines a trend of the utilization of the storage capacity of the file system.

6. The method of claim 5, wherein a size of the storage capacity of the file system is reduced by a first reduction amount in response to (i) the current utilization of the storage capacity for the current time period exceeding the predicted future utilization of the storage capacity for the first time period and (ii) the predicted future utilization of the storage capacity for the first time period exceeding the predicted future utilization of the storage capacity for the second time period.

7. The method of claim 6, wherein the size of the storage capacity of the file system is reduced by a second reduction amount in response to (i) the predicted future utilization of the storage capacity for the second time period exceeding the predicted future utilization of the storage capacity for the first time period and (ii) the current utilization of the storage capacity for the current time period exceeding the predicted future utilization of the storage capacity for the second time period, wherein the second reduction amount is less than the first reduction amount.

8. The method of claim 1, wherein the extension of the storage capacity of the file system by the first extension amount is not performed in response to (a) a difference between (i) a current allocated storage capacity for the current time period and (ii) a predicted future utilization of the storage capacity for the first time period being less than a first gap threshold; and (b) the difference between (i) the current allocated storage capacity for the current time period and (ii) the predicted future utilization of the storage capacity for the first time period being above a second gap threshold.

9. The method of claim 1, wherein the size of the storage capacity of the file system is extended by a second extension amount in response to (i) the predicted future utilization of the storage capacity for the first time period exceeding the current utilization of the storage capacity for the current time period and (ii) the predicted future utilization of the storage capacity for the first time period exceeding the predicted future utilization of the storage capacity for the second time period, wherein the second extension amount is less than the first extension amount.

10. An apparatus comprising:
at least one processing device comprising a processor coupled to a memory;
the at least one processing device being configured to implement the following steps:
obtaining input data representing a utilization of a storage capacity of a file system of a given storage system;
predicting a future utilization of the storage capacity of the file system of the given storage system for one or more time periods based at least in part on at least a portion of the obtained input data;
automatically adjusting the storage capacity of the file system of the given storage system based at least in part on a result of a comparison of the predicted future utilization of the storage capacity to a current utilization of the storage capacity, wherein a size of the storage capacity of the file system is extended by a first extension amount in response to the predicted future utilization of the storage capacity for a second time period exceeding a predicted future utilization of the storage capacity for a first time period and the predicted future utilization of the storage capacity for the first time period exceeding the current utilization of the storage capacity; and
storing one or more objects in the file system of the given storage system, during at least one of the one or more time periods, using the adjusted storage capacity.

11. The apparatus of claim 10, wherein the prediction is performed using a trained long short-term memory network and wherein a Bayesian optimization is performed to tune one or more hyperparameters of a long short-term memory network to obtain the trained long short-term memory network.

12. The apparatus of claim 10, wherein the first and second time periods follow a current time period, and wherein the comparison determines a trend of the utilization of the storage capacity of the file system.

13. The apparatus of claim 12, wherein the size of the storage capacity of the file system is extended by a second extension amount in response to (i) the predicted future utilization of the storage capacity for the first time period exceeding the current utilization of the storage capacity for the current time period and (ii) the predicted future utilization of the storage capacity for the first time period exceeding the predicted future utilization of the storage capacity for the second time period, wherein the second extension amount is less than the first extension amount.

14. The apparatus of claim 12, wherein a size of the storage capacity of the file system is reduced by a first reduction amount in response to (i) the current utilization of the storage capacity for the current time period exceeding the predicted future utilization of the storage capacity for the first time period and (ii) the predicted future utilization of the storage capacity for the first time period exceeding the predicted future utilization of the storage capacity for the second time period, and wherein the size of the storage capacity of the file system is reduced by a second reduction amount in response to (i) the predicted future utilization of the storage capacity for the second time period exceeding the predicted future utilization of the storage capacity for the first time period and (ii) the current utilization of the storage capacity for the current time period exceeding the predicted future utilization of the storage capacity for the second time period, wherein the second reduction amount is less than the first reduction amount.

15. A non-transitory processor-readable storage medium having stored therein program code of one or more software programs, wherein the program code when executed by at least one processing device causes the at least one processing device to perform the following steps:
obtaining input data representing a utilization of a storage capacity of a file system of a given storage system;
predicting a future utilization of the storage capacity of the file system of the given storage system for one or more time periods based at least in part on at least a portion of the obtained input data;
automatically adjusting the storage capacity of the file system of the given storage system based at least in part on a result of a comparison of the predicted future utilization of the storage capacity to a current utilization of the storage capacity, wherein a size of the storage capacity of the file system is extended by a first extension amount in response to the predicted future utilization of the storage capacity for a second time period exceeding a predicted future utilization of the storage capacity for a first time period and the predicted future utilization of the storage capacity for the first time period exceeding the current utilization of the storage capacity; and
storing one or more objects in the file system of the given storage system, during at least one of the one or more time periods, using the adjusted storage capacity.

16. The non-transitory processor-readable storage medium of claim 15, wherein the prediction is performed using a trained long short-term memory network and wherein a Bayesian optimization is performed to tune one or more hyperparameters of a long short-term memory network to obtain the trained long short-term memory network.

17. The non-transitory processor-readable storage medium of claim 15, wherein the first and second time periods follow a current time period, and wherein the comparison determines a trend of the utilization of the storage capacity of the file system.

18. The non-transitory processor-readable storage medium of claim 17, wherein the size of the storage capacity of the file system is extended by a second extension amount in response to (i) the predicted future utilization of the storage capacity for the first time period exceeding the current utilization of the storage capacity for the current time period and (ii) the predicted future utilization of the storage capacity for the first time period exceeding the predicted future utilization of the storage capacity for the second time period, wherein the second extension amount is less than the first extension amount.

19. The non-transitory processor-readable storage medium of claim 17, wherein a size of the storage capacity of the file system is reduced by a first reduction amount in response to (i) the current utilization of the storage capacity for the current time period exceeding the predicted future utilization of the storage capacity for the first time period and (ii) the predicted future utilization of the storage capacity for the first time period exceeding the predicted future utilization of the storage capacity for the second time period.

20. The non-transitory processor-readable storage medium of claim 19, wherein the size of the storage capacity of the file system is reduced by a second reduction amount in response to (i) the predicted future utilization of the storage capacity for the second time period exceeding the predicted future utilization of the storage capacity for the first time period and (ii) the current utilization of the storage capacity for the current time period exceeding the predicted future utilization of the storage capacity for the second time period, wherein the second reduction amount is less than the first reduction amount.

* * * * *